United States Patent
Pfeifer et al.

(10) Patent No.: US 9,346,019 B2
(45) Date of Patent: May 24, 2016

(54) COATED DIESEL PARTICLE FILTER

(71) Applicant: Umicore AG & Co. KG, Hanau-Wolfgang (DE)

(72) Inventors: Marcus Pfeifer, Solingen (DE); Michael Schiffer, Hanau (DE); Franz Dornhaus, Rodgau (DE); Stephan Basso, Metz (FR); Frank-Walter Schuetze, Haibach (DE)

(73) Assignee: Umicore AG & CO. KG, Hanau-Wolfgang (DE)

( * ) Notice: Subject to any disclaimer, the term of this patent is extended or adjusted under 35 U.S.C. 154(b) by 434 days.

(21) Appl. No.: 13/864,669

(22) Filed: Apr. 17, 2013

(65) Prior Publication Data

US 2013/0302214 A1    Nov. 14, 2013

Related U.S. Application Data

(60) Provisional application No. 61/637,883, filed on Apr. 25, 2012.

(30) Foreign Application Priority Data

Apr. 20, 2012    (EP) ..................... 12164927

(51) Int. Cl.
| | |
|---|---|
| *B01D 53/94* | (2006.01) |
| *F01N 3/035* | (2006.01) |
| *F01N 3/022* | (2006.01) |
| *F01N 3/10* | (2006.01) |
| *F01N 3/20* | (2006.01) |

(52) U.S. Cl.
CPC ............ *B01D 53/9477* (2013.01); *F01N 3/035* (2013.01); *B01D 2255/106* (2013.01); *B01D 2255/1021* (2013.01); *B01D 2255/1023* (2013.01); *B01D 2258/012* (2013.01); *F01N 3/0222* (2013.01); *F01N 3/106* (2013.01); *F01N 3/2066* (2013.01); *F01N 2510/0682* (2013.01); *F01N 2510/0684* (2013.01); *Y02T 10/24* (2013.01); *Y10T 29/49826* (2015.01)

(58) Field of Classification Search
None
See application file for complete search history.

(56) References Cited

U.S. PATENT DOCUMENTS

| | | | |
|---|---|---|---|
| 2,730,189 | A | 1/1956 | Holzmann |
| 6,805,849 | B1 | 10/2004 | Andreasson et al. |
| 7,498,010 | B2 | 3/2009 | Andreasson et al. |

(Continued)

FOREIGN PATENT DOCUMENTS

| | | |
|---|---|---|
| DE | 1 027 880 B | 4/1958 |
| DE | 102012025751 | 7/2015 |

(Continued)

OTHER PUBLICATIONS

Blakeman et al. U.S. Appl. No. 61/569,530, Dec. 12, 2011.*

(Continued)

*Primary Examiner* — Walter D Griffin
*Assistant Examiner* — Jelitza Perez
(74) *Attorney, Agent, or Firm* — Smith, Gambrell & Russell, LLP

(57) ABSTRACT

The present invention relates to a diesel particle filter which has a coating active in oxidation catalysis and which is characterized in that said diesel particle filter comprises a material zone which removes platinum traces contained in the exhaust-gas flow, and to the use of said diesel particle filter in the purification of exhaust gases of diesel engines.

22 Claims, 1 Drawing Sheet

(56) References Cited

U.S. PATENT DOCUMENTS

Figure 1:
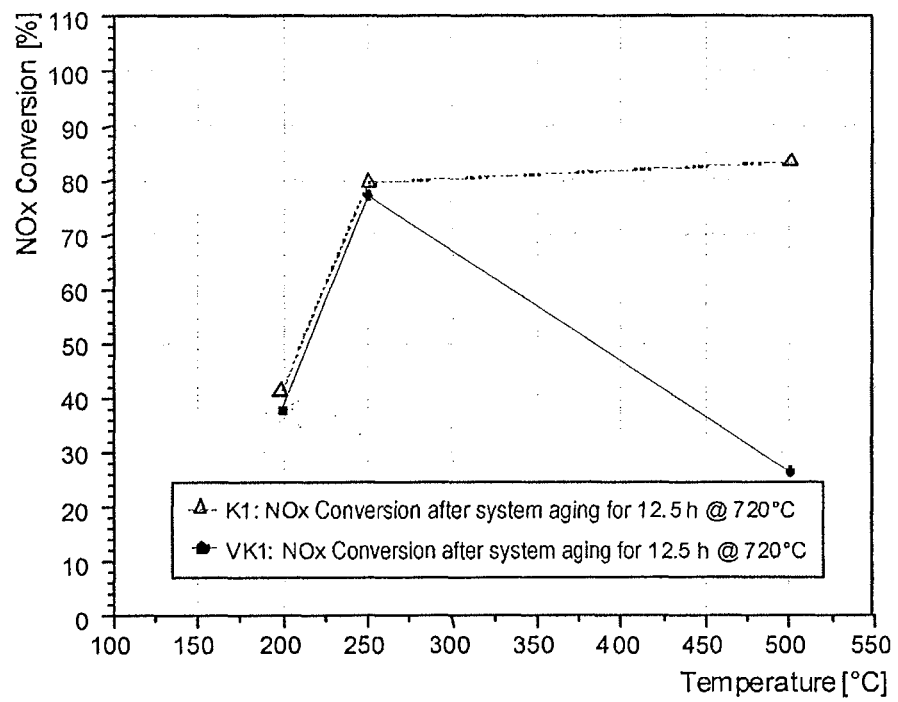

| | | | |
|---|---|---|---|
| 8,057,768 | B2 | 11/2011 | Schneider et al. |
| 2007/0240402 | A1 | 10/2007 | Andreasson et al. |
| 2010/0221161 | A1 | 9/2010 | Schneider et al. |
| 2011/0138777 | A1 | 6/2011 | Jen et al. |
| 2011/0206584 | A1 | 8/2011 | Dobson et al. |
| 2011/0286903 | A1 | 11/2011 | Andreasson et al. |
| 2013/0095013 | A1 | 4/2013 | Banno et al. |
| 2013/0149221 | A1* | 6/2013 | Blakeman ............ B01J 35/0006 423/213.5 |
| 2013/0149222 | A1* | 6/2013 | Blakeman ............ F01N 3/0828 423/213.5 |
| 2013/0149223 | A1* | 6/2013 | Blakeman ............ B01J 35/0006 423/213.5 |
| 2014/0050627 | A1 | 2/2014 | Mende et al. |
| 2014/0186244 | A1 | 7/2014 | Blakeman et al. |
| 2015/0139875 | A1 | 5/2015 | Schuetze et al. |

FOREIGN PATENT DOCUMENTS

| | | |
|---|---|---|
| EP | 1 938 893 | 7/2008 |
| GB | 201200781 | 2/2012 |
| GB | 2497658 | 5/2015 |
| JP | 2010/211946 | 9/2010 |
| WO | 99/39809 A1 | 8/1999 |
| WO | 2008/117941 A1 | 10/2008 |
| WO | 2009/140989 A1 | 11/2009 |
| WO | 2011162030 | 12/2011 |
| WO | 2013/088133 | 6/2013 |

OTHER PUBLICATIONS

Blakeman et al. U.S. Appl. No. 61/569,537, Dec. 12, 2011.*
Giovanni Cavataio, et al., "Impact and Prevention of Ultra-Low Contamination of Platinum Group Metals on SCR Catalysts Due to DOC Design", SAE International, 2009,13 pages, SAE 2009-01-627.
European Search Report for Application No. EP 12 16 4927 dated Aug. 6, 2012.
Giovanni Cavataio, et al., "Impact and Prevention of Ultra-Low Contamination of Platinum Group Metals on SCR Catalysts Due to DOC Design", SAE International, 2009,13 pages, SAE 2005-01-627.
Hung-Wen Jen, et al., "Detection, Origin and Effect of Ultra-Low Platinum Contamination on Diesel-SCR Catalysts", SAE Technical Paper Series,2008, 9 pages, SAE 2008-01-2488.
M. Pfeifer, et al., "The Second Generation of Catalyzed Diesel Particulate Filter Systems for Passenger Cars—Particulate Filters with Integrated Oxidation Catalyst Function—", SAE Technical Paper Series, 2005 SAE World Congress, Detroit, Michigan, Apr. 11-14, 2005, 15 sheets. (2005-01-1756).

* cited by examiner

COATED DIESEL PARTICLE FILTER

The present invention relates to a coated diesel particle filter, and to the use thereof in the purification of exhaust gases of diesel engines.

The exhaust gas of motor vehicles operated with diesel engines comprises not only carbon monoxide (CO) and nitrogen oxides ($NO_x$) but also constituents which originate from the incomplete combustion of the fuel in the combustion chamber of the cylinder. Said constituents include not only residual hydrocarbons (HC), which are usually likewise present predominantly in gaseous form, but also particle emissions also referred to as "diesel soot" or "soot particles".

For the purification of said exhaust gases, said constituents must be converted as completely as possible into non-hazardous compounds, which is possible only using suitable catalytic converters.

For example, carbon monoxide (CO), gaseous hydrocarbons (HC) and possibly organic agglomerates adhered to the soot particles (so-called "volatile organic fraction" VOF) may be removed by oxidation with the aid of oxidation catalytic converters. Oxidation catalytic converters have been known for a long time in the prior art and have been described in a wide variety of embodiments. As components active in oxidation catalysis, use is usually made of the noble metals platinum and/or palladium.

For the removal of particle emissions from the exhaust gas of diesel vehicles, use is made of special particle filters which, to improve their characteristics, may be provided with a coating active in oxidation catalysis. Such a coating serves, as described in detail in the SAE document SAE 2005-01-1756, for lowering the activation energy for the oxygen-based particle burn-off (soot combustion) and thus for decreasing the soot ignition temperature on the filter, for improving the passive regeneration behavior by oxidation of nitrogen monoxide contained in the exhaust gas to form nitrogen dioxide, and for suppressing breakthroughs of hydrocarbon and carbon monoxide emissions.

Nitrogen oxides from exhaust gases of diesel engines may be converted into non-hazardous nitrogen for example by means of selective catalytic reduction (SCR) with ammonia as reducing agent on a suitable catalytic converter, the SCR catalytic converter. The reducing agent must be introduced into the exhaust tract from an on-board auxiliary tank by means of an injection nozzle upstream of the SCR catalytic converter. It is however preferable for not ammonia itself but rather a compound which breaks down easily to form ammonia, for example urea or ammonium carbamate, to be carried on board.

In order that the hazardous exhaust-gas components discussed can be removed to the required extent, the stated catalytic converters and/or filters must be combined with one another in a suitable way to form an exhaust-gas treatment system.

In known exhaust-gas treatment systems which are described for example in WO 99/39809 and WO 2009/140989, as viewed in the flow direction of the exhaust gas, the oxidation catalytic converter is arranged first, followed by the diesel particle filter and finally the SCR catalytic converter. Between the diesel particle filter and the SCR catalytic converter there is furthermore situated an injection device for the dosing of the reducing agent.

It has been found during the operation of said systems that, at high temperatures and regardless of the A value, the oxidation catalytic converter, in particular if it is rich in platinum, releases traces of platinum into the gas phase, which traces of platinum are transported with the exhaust-gas flow to the SCR catalytic converter and contaminate the latter. Since platinum exhibits high activity for the oxidation of ammonia, this has the effect that, at relatively high temperatures above approximately 300° C., there is no longer sufficient ammonia available for the SCR reaction, and the conversion of nitrogen oxides decreases. Furthermore, an increased formation of dinitrogen monoxide ($N_2O$) is observed primarily in the temperature range around 250° C. Said phenomenon is described for example in the SAE documents SAE 2008-01-2488 and SAE 2009-01-0627.

To solve said problem, US2011/138777 A1 proposes the arrangement of a "platinum group metal trap", which comprises cerium oxide or a perovskite material as active constituents, in the exhaust system downstream of the oxidation catalytic converter and upstream of the SCR catalytic converter.

This however has the disadvantage that the exhaust-gas treatment system must be expanded to include an additional component, which, with regard to the restricted space in the underbody region of a vehicle, can be realized only with difficulty. Said solution also leads to higher costs.

It is thus an object of the present invention to provide measures which make it possible to remove platinum traces released from the oxidation catalytic converter or other components and to prevent contamination of the SCR catalytic converter, without additional components thus being required or significantly higher costs being incurred. Furthermore, the function of the exhaust-gas treatment system as a whole, or of the individual constituent parts thereof, must remain as unaffected as possible.

It has now been found, surprisingly, that said object is achieved if a suitable platinum trap is integrated into the particle filter.

The present invention accordingly relates to a diesel particle filter which has a coating active in oxidation catalysis and which is characterized in that said diesel particle filter comprises a material zone which removes platinum traces contained in the exhaust-gas flow.

The present invention furthermore relates to a method for preventing the contamination of an SCR catalytic converter in an exhaust-gas treatment system which comprises, as viewed in the flow direction of the exhaust gas, an oxidation catalytic converter comprising platinum, a diesel particle filter and an SCR catalytic converter, characterized in that the diesel particle filter described above is used as a diesel particle filter.

The present invention finally relates to an exhaust-gas treatment system for the purification of exhaust gases of a diesel engine, which exhaust-gas treatment system comprises, as viewed in the flow direction of the exhaust gas, an oxidation catalytic converter comprising platinum, a diesel particle filter and an SCR catalytic converter, and which exhaust-gas treatment system is characterized in that the diesel particle filter described above is used as a diesel particle filter.

As a diesel particle filter, use is preferably made of wall-flow filter substrates. These are honeycomb bodies with inflow and outflow ducts which are alternately closed off in a gas-tight manner and which are delimited and separated from one another by porous walls. The particle-containing exhaust gas that flows into the inflow ducts is forced to pass through the porous wall by a gas-tight closure plug situated on the outlet side, and emerges from the wall-flow filter substrate again from the outflow ducts which are closed off on the inflow side. In the process, diesel soot is filtered out of the exhaust gas.

The honeycomb bodies may be composed of metal and in particular of ceramic materials. Said honeycomb bodies are preferably composed of cordierite, of silicon carbide, of mullite or of aluminum titanate. Such honeycomb bodies have been described on numerous occasions in the literature.

Diesel particle filters provided with a coating active in oxidation catalysis are known, and described in the literature, as cDPF (catalyzed diesel particulate filter). Said diesel particle filters generally have one or more platinum group elements, in particular platinum, palladium and/or rhodium, as constituents active in oxidation catalysis. These are present in the form of a coating carried on the filter substrate on an inert carrier material with a large surface area. A particularly preferred coating active in oxidation catalysis comprises platinum on aluminum oxide.

According to the invention, said diesel particle filter active in oxidation catalysis is now provided with an additional material zone which removes the platinum traces contained in the exhaust-gas flow.

Here, said material zone may be present in various forms. In one embodiment of the present invention, said material zone is present as an additional layer on the coating active in oxidation catalysis and completely covers said coating at the exhaust-gas side. Said material zone is thus distributed over the entire length of the diesel particle filter.

In a preferred embodiment of the present invention, said material zone is likewise present as an additional layer on the coating active in oxidation catalysis, but only partially covers said coating at the exhaust-gas side. Said material zone is thus distributed only over a part of the total length of the diesel particle filter. The material zone which removes the platinum traces contained in the exhaust-gas flow occupies in this case approximately 10 to 60% of the total length of the filter substrate, but at least 2.5 cm (approximately 1 inch).

In a further embodiment, the coating active in oxidation catalysis and the material zone which removes the platinum traces contained in the exhaust-gas flow are arranged in separate zones on the filter substrate. By contrast to the embodiments described above, it is the case here that the coating active in oxidation catalysis does not extend over the entire length of the filter substrate.

If, therefore, the total length of the filter substrate is L, the length of the zone active in oxidation catalysis is $L_1$ and the length of the zone which removes the platinum traces contained in the exhaust-gas flow is $L_2$, then $L=L_1+L_2$.

In preferred embodiments of the present invention, the material zone which removes the platinum traces contained in the exhaust-gas flow ($L_1$) occupies 10 to 60% of the total length of the filter substrate, but at least 2.5 cm (approximately 1 inch). Accordingly, the zone active in oxidation catalysis ($L_2$) occupies 40 to 90% of the total length of the filter substrate.

In diesel particle filters according to the invention in which the coating active in oxidation catalysis and the material zone which removes the platinum traces contained in the exhaust-gas flow are present in separate zones, the latter material zone is preferably arranged at the filter outflow side. That is to say the material zone which removes the platinum traces contained in the exhaust-gas flow points in the direction of the SCR catalytic converter after the installation of the filter into an exhaust-gas treatment system.

The material zone or layer which removes platinum traces contained in the exhaust-gas flow preferably comprises palladium, gold or mixtures thereof as an active constituent. Said material zone or layer is preferably free from other catalytically active constituents. The stated active constituents for increasing the efficiency as a platinum trap are however preferably present in highly dispersed form on typical carrier oxides. This will be described in more detail below. In the fresh state, that is to say before the diesel particle filter according to the invention is put into use, the material zone or layer is free from platinum. The platinum traces removed from the exhaust gas self-evidently accumulate with progressive usage duration, but from experience, these lie only in the ppm range and thus have no effect or only an insufficient effect for most catalytic functions.

The amounts of palladium, gold or mixtures thereof to be used are dependent on the specific requirements of the exhaust-gas treatment system under consideration. In general, however, the amounts are 0.02 to 0.21 g/l (0.5 to 6 g/ft$^3$), preferably 0.04 to 0.11 g/l (1 to 3 g/ft$^3$) (the amounts relate to the filter volume occupied by the material zone or layer).

Palladium, gold or mixtures thereof are present on the diesel particle filter preferably on an inert carrier oxide with a large surface area. Suitable carrier oxides are aluminum oxides, doped aluminum oxides, titanium dioxide, cerium oxide, zirconuim oxide, cerium/zirconium mixed oxides, silicon dioxide or mixtures of two or more of the stated oxides. These are known to the person skilled in the art and are commercially available.

The diesel particle filter according to the invention is especially suitable as a constituent part of an exhaust-gas treatment system for the purification of exhaust gases of a diesel engine, which exhaust-gas treatment system comprises, as viewed in the flow direction of the exhaust gas, an oxidation catalytic converter comprising platinum, the diesel particle filter according to the invention and an SCR catalytic converter.

As a platinum-containing oxidation catalytic converter, consideration is given in particular to conventional oxidation catalytic converters which have been described on numerous occasions and which are known to a person skilled in the art. These are generally throughflow honeycomb bodies to which the catalytically active constituents are applied in the form of a coating. Aside from platinum, said constituents may also include further metals active in oxidation catalysis, such as for example palladium and rhodium.

It is also possible, as an SCR catalytic converter, for use to be made of conventional products which have been described on numerous occasions and which are known to a person skilled in the art. These, too, are normally throughflow honeycomb bodies to which the catalytically active constituents are applied in the form of a coating.

SCR catalytic converters based on vanadium oxide or based on vanadium-free mixed oxides are suitable, as are those based on zeolite. SCR catalytic converters based on zeolite are preferable, in particular those which are exchanged with iron and/or copper.

The application of the catalytically active coating to throughflow honeycomb bodies and filter bodies is performed using the conventional dip coating processes or pumping and suction coating processes with subsequent thermal aftertreatment (calcination and possible reduction with forming gas or hydrogen), which are sufficiently well known for said exhaust-gas purification units from the prior art.

The diesel particle filter according to the invention is extremely well suited to the removal of platinum traces which are contained in the exhaust gas. Said diesel particle filter therefore sustainably protects SCR catalytic converters which follow at the outflow side against contamination with platinum, and therefore against loss of activity.

Said diesel particle filter can therefore also be advantageously used as a diesel particle filter in an exhaust-gas treatment system for the purification of exhaust gases of a diesel engine, which exhaust-gas treatment system comprises, as viewed in the flow direction of the exhaust gas, an oxidation catalytic converter comprising platinum, a diesel particle filter and an SCR catalytic converter.

EXAMPLE 1

A conventional wall-flow filter coated with platinum and palladium homogeneously over its entire length and having a noble metal loading of 15 g/ft$^3$ and having a Pt/Pd ratio of 12/1 was coated, over one quarter of its length, with an additional palladium-containing zone by means of a conventional dip process. The amount of palladium was 6 g/ft$^3$ in relation to the volume of the zone, such that the total noble metal loading on the filter increased to 16.5 g/ft$^3$.

Said diesel particle filter according to the invention (referred to below as K1) was tested as follows and compared with the abovementioned conventional wall-flow filter without additional palladium loading (referred to below as VK1):

A core sample with a diameter of 25.4 millimeters was extracted from K1 and installed into a test exhaust-gas treatment system which comprised, at the inflow side, a core sample of a conventional diesel oxidation catalytic converter (diameter 25.4 millimeters; noble metal loading 27 g/ft$^3$; Pt/Pd ratio 5/2) and, at the outflow side, a conventional SCR catalytic converter based on Fe zeolite. The core sample of K1 was installed such that the additional, Pd-containing zone pointed in the direction of the SCR catalytic converter.

Said test exhaust-gas treatment system was firstly aged at a temperature of 720° C. at the inflow side of the diesel oxidation catalytic converter (corresponds to 700° C. at the outflow side of the diesel oxidation catalytic converter) for 12.5 hours in a gas of 10% oxygen and 90% nitrogen.

The NOx conversion rate of the SCR catalytic converter and also the $N_2O$ formation at 500° C., 250° C. and 200° C. were then determined in a model gas system.

The following model gas was used:
NO 500 ppm
$NO_2$ -
$NH_3$ 450 ppm (alpha=0.9)
$O_2$ 5%
$H_2O$ 5%
$N_2$ Remainder The stated method was repeated with a core sample of VK1.

FIG. 1 shows the result with regard to the NOx conversion rate. According to said figure, the systems comprising K1 and VK1 do not differ significantly at 200° C. and 250° C. At 500° C., however, while the system comprising the filter K1 according to the invention remains at a high conversion level, the system comprising the conventional filter VK1 exhibits a dramatic decrease of the NOx conversion.

Figure 2:
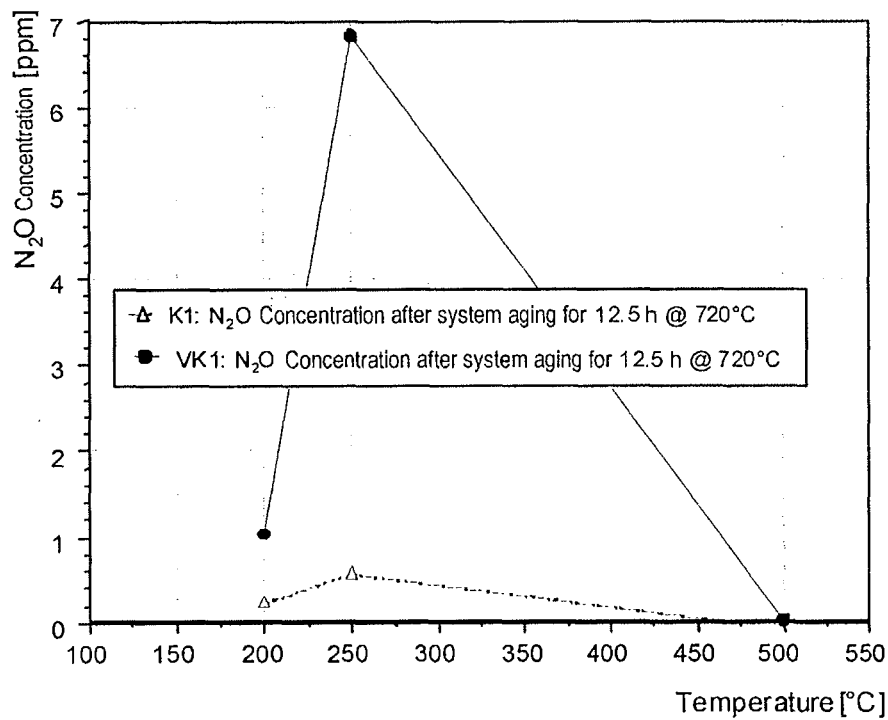

FIG. 2 shows the result with regard to the formation of $N_2O$. While the system comprising the filter K1 according to the invention forms only small amounts of $N_2O$ over the entire measurement range, the system comprising the conventional filter VK1 exhibits a dramatic increase of the formation of $N_2O$ at 250° C.

It is thus obvious that the additional palladium zone on the diesel particle filter according to the invention protects the outflow-side SCR catalytic converter against platinum contamination in an effective manner.

The invention claimed is:

1. A diesel particle filter which has a coating active in oxidation catalysis and wherein said diesel particle filter comprises a material zone which removes platinum traces contained in an exhaust-gas flow.

2. The diesel particle filter as claimed in claim 1, wherein said diesel particle filter is a wall-flow filter substrate comprised of cordierite, silicon carbide, mullite or aluminum titanate.

3. The diesel particle filter as claimed in claim 1, wherein the coating active in oxidation catalysis comprises one or more platinum group elements.

4. The diesel particle filter as claimed in claim 1, wherein the material zone which removes platinum traces contained in the exhaust-gas flow is present in the form of an additional layer on the coating active in oxidation catalysis and completely covers said coating at an exhaust-gas side.

5. The diesel particle filter as claimed in claim 1, wherein the material zone which removes platinum traces contained in the exhaust-gas flow is present in the form of an additional layer on the coating active in oxidation catalysis and only partially covers said coating at an exhaust-gas side.

6. The diesel particle filter as claimed in claim 1, further comprising a filter substrate, and wherein the coating active in oxidation catalysis and the material zone which removes the platinum traces contained in the exhaust-gas flow are present in separate zones on the filter substrate.

7. The diesel particle filter as claimed in claim 5, wherein the material zone which removes the platinum traces contained in the exhaust-gas flow occupies 10 to 60% of the total length of the filter substrate, but at least 2.5 cm (approximately 1 inch).

8. The diesel particle filter as claimed in claim 5, wherein the material zone which removes the platinum traces contained in the exhaust-gas flow is arranged at an outflow side of the filter.

9. The diesel particle filter as claimed in claim 1, wherein the material zone which removes platinum traces contained in the exhaust-gas flow comprises palladium, gold or mixtures thereof as an active constituent.

10. The diesel particle filter as claimed in claim 9, wherein palladium, gold or mixtures thereof are present in amounts of 0.02 to 0.21 g/l (0.5 to 6 g/ft$^3$) in relation to the filter volume occupied by the material zone.

11. The diesel particle filter as claimed in claim 9, wherein palladium, gold or mixtures thereof are present in amounts of 0.04 to 0.11 g/l (1 to 3 g/ft$^3$) in relation to the filter volume occupied by the material zone.

12. The diesel particle filter as claimed in claim 9, wherein palladium, gold or mixtures thereof are present on an inert carrier oxide with a large surface area.

13. The diesel particle filter as claimed in claim 12, wherein the inert carrier oxide is aluminum oxide, doped aluminum oxide, titanium dioxide, cerium oxide, zirconium oxide, cerium/zirconium mixed oxide, silicon dioxide or a mixture of two or more of the stated oxides.

14. A method of manufacturing an exhaust-gas treatment system for preventing the contamination with platinum of a selective catalytic reduction (SCR) catalytic converter in the exhaust-gas treatment system which comprises arranging, as viewed in the flow direction of the exhaust gas, an oxidation catalytic converter comprising platinum, the diesel particle filter of claim 1 and an SCR catalytic converter.

15. An exhaust-gas treatment system for the purification of exhaust gases of a diesel engine, which exhaust-gas treatment system comprises, as viewed in the flow direction of the exhaust gas, an oxidation catalytic converter comprising platinum, the diesel particle filter of claim 1 and an SCR catalytic converter.

16. A diesel particle filter which has a coating active in oxidation catalysis and wherein said diesel particle filter comprises a material zone which removes platinum traces contained in an exhaust-gas flow, wherein the material zone comprises palladium as an active constituent.

17. The diesel particle filter of claim 16, wherein the material zone consists of only palladium as the active constituent.

18. The diesel particle filter of claim 16, wherein the palladium is present in an amount of about 0.04 to 0.11 g/l (1 to 3 g/ft3) in relation to the filter volume occupied by the material zone.

19. The diesel particle filter of claim 16, wherein the material zone occupies at least 1.5 inches of the total length of the filter substrate.

20. The diesel particle filter of claim 16, wherein the material zone is arranged at an outflow side of the filter.

21. An exhaust-gas treatment system for the purification of exhaust gases of a diesel engine, which exhaust-gas treatment system comprises, as viewed in the flow direction of the exhaust gas, an oxidation catalytic converter comprising platinum, the diesel particle filter of claim 16, and an SCR catalytic converter.

22. A method of assembling a catalytic system, comprising: assembling together, as viewed in the flow direction of the exhaust gas, an oxidation catalytic converter comprising platinum, the diesel particle filter of claim 16, and an SCR catalytic converter.

* * * * *